United States Patent [19]

Petrak et al.

[11] Patent Number: 5,707,471
[45] Date of Patent: Jan. 13, 1998

[54] METHOD FOR MAKING CERAMIC MATRIX COMPOSITES

[75] Inventors: Daniel Ralph Petrak; Gary Lee Stark; Gregg Alan Zank, all of Midland, Mich.

[73] Assignee: Dow Corning Corporation, Midland, Mich.

[21] Appl. No.: 538,062

[22] Filed: Oct. 2, 1995

Related U.S. Application Data

[63] Continuation of Ser. No. 811,285, Dec. 20, 1991, abandoned.

[51] Int. Cl.$^6$ .................................................. C04B 37/00
[52] U.S. Cl. ........................... 156/89; 264/624; 264/625; 264/626; 264/640; 264/641; 427/215; 427/226; 427/227; 427/228
[58] Field of Search ................................ 264/60, 62, 624, 264/625, 626, 640, 641; 427/215, 226, 227, 228; 156/62.2, 89

[56] References Cited

U.S. PATENT DOCUMENTS

| | | | |
|---|---|---|---|
| 5,145,812 | 9/1992 | Arai et al. | 501/97 |
| 5,502,142 | 3/1996 | Sneddon et al. | 528/7 |

*Primary Examiner*—Christopher A. Fiorilla
*Attorney, Agent, or Firm*—Sharon K. Severance

[57] ABSTRACT

Fiber reinforced ceramic matrix composites are prepared by coating refractory fibers having a interfacial coating thereon with a curable preceramic polymer having a char which contains greater than about 50% sealant oxide atoms followed by forming the coated fibers into the desired shape, curing the coated fibers to form a pre-preg, heating the pre-preg to form a composite and heating the composite in an oxidizing environment to form an in situ sealant oxide coating on the composite. The resultant composites have good oxidation resistance at high temperature as well as good strength and toughness.

20 Claims, No Drawings

METHOD FOR MAKING CERAMIC MATRIX COMPOSITES

This is a continuation of application Ser. No. 07/811,285 filed on Dec. 20, 1991, now abandoned.

BACKGROUND OF THE INVENTION

The present invention relates to a method of making novel ceramic matrix composites which comprise coated refractory fibers within ceramic matrices derived from curable preceramic polymers. These composites can be formed into complex shapes which have good oxidation resistance at high temperatures, high strength and toughness, and a wide range of dielectric properties.

Ceramic matrix composites and numerous methods for their production are well known in the art. For instance, several recent review articles such as that of Mah et al., Ceramic Bulletin, Vol. 66, No. 2 (1987), and that of Schioler et al., Ceramic Bulletin, Vol. 65, No. 2 (1986), describe the matrices, fibers, processing and characterization of various composites. Techniques described therein include hot-pressing various glass or glass-ceramic precursors into fibrous phases as well as the use of chemical vapor infiltration to impregnate fibrous phases with volatile, ceramic precursors. Such composites and methods, however, differ from those described herein.

Chi et al. in U.S. Pat. Nos. 4,460,639 and 4,460,640 and Haluska in U.S. Pat. No. 4,460,630 also describe ceramic matrix composites and their methods of manufacture. It is taught therein that organosilsesquioxanes, organopolysiloxanes and polysilazanes, respectively, can be used as matrix precursors in a polymer infiltration process. The fiber used to manufacture such composites, however, do not have the coating described herein and, thus, the properties of the composites are significantly different.

Boisvert et al., Ceram. Eng. Sci. Proc., 9 pp. 873-880 (1988), likewise describe the use of polyvinylsilane in a polymer infiltration process for producing ceramic composites. This reference, however, is limited to the use of carbon coated fibers in matrices derived from polyvinylsilane.

The present inventors have unexpectedly found that composites with properties superior to those known in the art can be formed by incorporating coated refractory fibers into a matrix which is derived from specific preceramic polymers.

SUMMARY OF THE INVENTION

The present invention relates to a method of making fiber reinforced ceramic matrix composites. The method comprises impregnating coated fibers with a matrix mixture comprising a curable preceramic polymer and, optionally, ceramic fillers. The impregnated fibers are next formed into the desired shape and cured to form a molded part. The molded part is then heated to a temperature of at least about 1000° C. in an inert atmosphere for a time effective to convert the preceramic polymer to a ceramic. If desired, composites derived in the above manner can be reimpregnated with the polymer solution to decrease the open porosity.

DETAILED DESCRIPTION OF THE INVENTION

The present invention is based on the discovery that novel ceramic matrix composites may be formed using fibers having interfacial coatings thereon within matrices derived from curable preceramic polymers. These composites have excellent strength and toughness and many retain these properties at elevated temperatures in air.

The refractory fibers which may be used in this invention comprise any high-modulus fibers which are compatible with the interfacial coatings and matrices described herein and which can withstand the polymer infiltration processing. These fibers are well known in the art and many are commercially available. Examples of suitable fibers include those of silicon carbide, silicon nitride, silicon carbide deposited on a carbon core, aluminum borate, aluminum oxide, silicon oxide, silicon carbide containing titanium, silicon oxycarbides, silicon oxycarbonitrides, carbon and the like. Generally, such fibers should have a modulus greater than about 100 GPa, preferably greater than 150 GPa. These fibers may contain any desirable number of filaments per tow and have a size in the range of about 5 micrometers to about 500 micrometers.

Examples of specific fibers include silicon carbide fibers with a diameter in the range of 10–20 micrometers manufactured by Nippon Carbon and sold under the trade name "Nicalon"; fibers comprising silicon carbide deposited on a carbon core with a diameter of about 143 micrometers manufactured by Avco and designated "SCS-6"; alumina-boria-silica fibers with a diameter of about 10–12 micrometers manufactured by 3M and sold under the tradenames "Nextel 312", "Nextel 440" and "Nextel 480"; Al2O3 fibers with a diameter of about 20 micrometers manufactured by Du Pont under the designation "FP"; $SiO_2$ fibers with a diameter of about 8–10 micrometers manufactured by J. P. Stevens; Al2O3-SiO2 fibers with a diameter in the range of about 9–17 micrometers manufactured by Sumitomo; silicon carbide fibers containing titanium with a diameter in the range of 8–10 micrometers manufactured by Ube and sold under the tradename "Tyranno"; silicon carbide fiber with a diameter in the range of about 6–10 micrometers manufactured by Avco; silicon oxycarbonitride fibers with a diameter in the range of about 10–15 micrometers manufactured by Dow Corning designated "MPDZ" and "HPZ"; silicon carbide fibers with a diameter in the range of about 10–15 micrometers manufactured by Dow Corning designated "MPS"; silicon nitride fibers such as those produced by Torten or Rhone Poulanc and Al2O3-ZrO2 fibers with a diameter of about 20 micrometers manufactured by Du Pont and Designated "PRD-166".

Although any of the above fibers are functional, those preferred herein comprise ceramic fibers of silicon, carbon, nitrogen and/or oxygen. Especially preferred are "Nicalon" silicon oxycarbide fibers and "HPZ" silicon oxycarbonitride fibers derived from hydridopolysilazane polymer.

The above fibers of this invention are provided with a coating to toughen the composite by preventing bonding and chemical reactions between the fibers and the matrix. This allows the fibers to debond and pullout under stress such that the composite does not undergo catastrophic failure as demonstrated by ceramic monoliths. Generally, any interfacial coating which has the above effect and which is compatible with the fiber and the matrix may be used herein. These include, for example, coatings of carbon, boron nitride, silicon carbide, silicon nitride, aluminum nitride, and combinations of the above. Such coatings and methods for their deposition are well known in the art. For instance, Corbin et al. in U.S. Pat. No. 4,885,199 describe the application of various interfacial coatings such as carbon on ceramic fibers, Rice in U.S. Pat. No. 4,642,271 describe the chemical vapor deposition of boron nitride on fibers, and Chyung et al. in EPA 90311185.4 describe the application of B-N-C coatings on fibers. Additionally, it is noted that certain fibers, when heated in the matrix, form in-situ interfacial layers such as carbon or boron nitride which may serve the same purpose as those described above.

The coatings of the invention are generally used in thicknesses which allow the fibers to debond and pullout under stress. Although the thickness is dependent on coating quality, typical thicknesses are generally in the range of about 0.05 to about 1.0 micron.

Especially preferred in the present invention is the use of boron nitride coatings or coating combinations which contain boron nitride. The present inventors have discovered that when fibers with such coatings are incorporated within the matrix of the present invention they have novel long-term stability at elevated temperature in air. This was particularly unexpected since boron nitride coated fibers are known to undergo oxidative degradation under such conditions. Thus, the composites of the present invention retain their properties under conditions which adversely affect the prior art composites (see eg., Example 6).

The coated fibers may be used in nearly any length and may be arranged in the matrix in nearly any manner desired. Generally, the fibers are essentially continuous and are either aligned unidirectionally, woven as a 2-dimensional fabric or shaped as a 3-dimensional reinforced preform. Such versatility in architecture is another advantage of the present composite system over prior art composites.

The matrices to be used in this invention are derived from curable preceramic polymers. The expression "curable" is used herein to describe polymers which can be deep section infusibilized (cured) in the composite under moderate conditions by means such as mild heat, radiation, curing catalysts or curing agents. This curability is essential to the invention to inhibit the composite from delaminating during pyrolysis.

When boron nitride coatings or boron nitride-containing coatings are used on the fibers of the present invention nearly any curable preceramic polymer can be used to form the matrix. When carbon coated fibers are used, however, polysilanes are specifically excluded from the claimed polymers.

Especially preferred in the present invention are curable preceramic polymers having a ceramic char containing at least about 50 weight percent silicon. Although not wishing to be bound by theory, it is thought that when a composite incorporating such a preceramic polymer is heated in an oxidizing environment, the surfaces of the composite exposed to the environment form in-situ silica ($SiO_2$) coatings. These coatings seal the exposed surface and protect the matrix and the interfacial coating on the fiber from further oxidation when subsequently heated in an oxidizing environment. Alternatively, if other atoms which form similar sealant oxide coatings (eg., titanium, zirconium, etc.) are included in the preceramic polymer, the total weight of silicon and the other sealant oxide atoms should be greater than about 50 weight percent.

The above curable preceramic polymers of the present invention are known in the art and can be manufactured by known techniques. Examples of suitable polymers include polysilazanes such as hydridosilazanes, vinyl modified polysilazanes, silacyclobutasilazanes, vinyl modified poly(disilyl)silazanes, and borosilazanes, polycarbosilanes, polysiloxanes, polysilanes, (except when interfacial coating is carbon) polysilsesquioxanes, polymetallosiloxanes and the like. Those of the above polymers with chars containing at least about 50 weight percent silicon (as in a preferred embodiment of the invention) can readily be determined by heating a sample of the polymer in an inert atmosphere to a temperature of about 1200° C. The resultant char is analyzed to determine the quantity of elements present and the weight percent silicon determined therefrom.

The preferred curable preceramic polymers of the present invention are polysilazanes and, of the polysilazanes, hydridopolysilazanes are more preferred. Such hydridopolysilazanes can be formed by techniques known in the art such as that of Cannady in U.S. Pat. No. 4,540,803, which is incorporated herein by reference. This process involves contacting and reacting in an inert, essentially anhydrous atmosphere trichlorosilane with a disilazane at a temperature in the range of 25° C. to 300° C. while distilling byproduced volatile byproducts. The disilazane used in the process has the formula $(R_3Si)_2NH$ where R is selected from the group consisting of vinyl, hydrogen, phenyl and alkyl radicals containing 1 to 3 carbon atoms.

An especially preferred embodiment of the Cannady invention involves the reaction of trichlorosilane with hexamethyldisilazane. The resultant polymer produced thereby, hydridopolysilazane (HPZ), has been shown to have valuable properties in the formation of ceramic composites.

The poly(disilyl)silazanes useful herein are manufactured by the method of Gaul in U.S. Pat. No. 4,340,619, which is incorporated herein by reference. This method comprises contacting and reacting in an inert, essentially anhydrous atmosphere a chlorine containing disilane or mixture of chlorine containing disilanes of the general formula $(Cl_aR_bSi)_2$ with a disilazane having the general formula $(R_3'Si)_2NH$ at a temperature in the range of 25° C. to 300° C. while distilling by-produced volatile products. R is vinyl, an alkyl group of 1–3 carbon atoms or a phenyl group; R' is vinyl, hydrogen an alkyl group of 1–3 carbon atoms or a phenyl group; a has a value of 0.5–3; b has a value of 0–2.5 and the sum of a+b equals 3.

An especially preferred embodiment of the Gaul invention involves the reaction of the disilane with hexamethyldisilazane. The resultant polymer produced thereby, methylpolydisilylazane, has been shown to have valuable properties.

The above hydridosilazane and poly(disilyl)silazane polymers may also be modified so as to add functional groups on the nitrogen atoms to allow for deep section curing of these polymers. A process for adding functional groups on such polymers is described in U.S. Pat. No. 5,086,126, entitled "Method for Producing Functional Silazane Polymers" by Louis Mahone. The teachings of the Mahone application are incorporated herein by reference. Basically, this process comprises reacting the silazane polymer with butyllithium (BuLi) to convert the N-H bonds to N-Li and then reacting this lithium modified silazane polymer with a chlorosilane containing the functional group.

The polysilacyclobutasilazanes of the invention may be prepared by the process of Burns in U.S. Pat. No. 4,835,238, which is incorporated herein by reference. Basically, this process comprises reacting 1,1-dichloro-1-silacyclobutane with a difunctional nucleophile selected from the group consisting of ammonia, hydrazines and diamines of the formula HRNQNRH, wherein R is as defined above and Q is a divalent hydrocarbon radical selected from alkylenes having 1–8 carbon atoms, arylenes, alkarylenes having 12 carbons or less and aralkylenes having 12 carbons or less.

The borosilazane polymers useful herein are likewise known in the art. They can be prepared, for instance, by methods such as those described in Japanese Kokai Patent No. Hei 2-84437. An especially preferred process comprises reacting a hydridopolysilazane, preferably that prepared by the reaction of trichlorsilane and hexamethyldisilazane (as set forth in the Cannady reference supra) polymer with borane. This process is described in U.S. Pat. No. 5,169,908 which is hereby incorporated by reference. The application describes the following reaction:

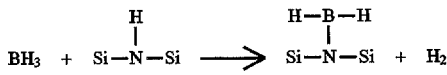

Such boron modified hydridopolysilazanes can be easily cured with the application of mild heat by the following reaction:

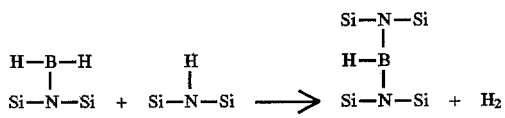

Still other polysilazanes which are useful in this invention are described in U.S. Pat. No. 4,460,638 which is incorporated herein by reference.

The polysiloxanes which are functional in this invention are also known in the art and can be produced by known methods. Examples of such materials are described in U.S. Pat. No. 4,460,640, which is incorporated by reference. These include, for instance, polysiloxanes with both Si-H and Si-vinyl functionality such that the materials can be crosslinked by platinum catalyzed addition reactions. Still other polysiloxanes include those with silanol (Si-OH) functionality which can be crosslinked by catalyzed or uncatalyzed silanol condensation reactions.

Silsesquioxanes which may function in the present invention are also known in the art and can be produced by known methods. Examples of suitable silsesquioxanes are described in U.S. Pat. No. 4,460,639 which is incorporated herein by reference. These include, for instance, phenylsilsesquioxanes and mixed phenyl-alkyl silsesquioxanes. Additional silsesquioxanes include hydrogen silsesquioxane as described in U.S. Pat. No. 3,615,272, which is incorporated herein by reference. Such materials are readily cured by the application of mild heat.

Other equivalent curable, silicon-containing, preceramic polymers are also included in the present invention. Those skilled in silicon chemistry can readily select such agents and methods for their production.

In addition to the above fibers and matrices, the composites of the present invention may also contain fillers. Fillers are used herein to decrease the amount of matrix shrinkage which occurs on pyrolysis so that the resultant composites have lower porosity. Suitable fillers are known in the art and can include, for example, powders, whiskers or particulates of Al2O3, SiO2, other metal oxides, silicon carbide, silicon nitride, silicon hexaboride, aluminum nitride, boron nitride and the like. The preferred fillers to be used herein are boron nitride, silicon carbide, silicon nitride, and aluminum nitride. Such fillers are generally included in amounts up to about 80 volume percent based on the volume of matrix material.

The composites herein are produced by polymer infiltration. This process comprises first impregnating the coated fibers with a liquid preceramic mixture comprising the curable preceramic polymer and, if desired, fillers. This preceramic mixture can be formed by either a solution or melt route. In the solution route the curable preceramic polymer and fillers are mixed in an organic solvent. The preferred solvents are those with a low vaporization point (such as lower than about 125° C.) at atmospheric pressure to facilitate removal from the impregnated fibers and those with less than about 1 percent by weight water. Examples of suitable organic solvents include aliphatic hydrocarbons such as hexane, heptane etc. and aromatic hydrocarbons such as benzene, toluene, etc.

The concentration of curable preceramic polymer in solution can be varied over a wide range with higher concentrations generally resulting in larger amounts of the preceramic polymer impregnating the fiber. Preferably, concentrations in the range of about 30 to about 60 weight percent are employed herein.

In the melt route, the curable preceramic polymer is heated to a temperature above its melting point yet below its curing temperature in an inert environment to form the preceramic mixture. Fillers may also be mixed in the molten polymer if desired.

The fibers are then impregnated with the preceramic mixture by any convenient means. For instance, the fibers can be immersed in the mixture, sprayed with the mixture, held under a stream of the mixture, etc. The impregnated fibers can additionally be manipulated to uniformly distribute the matrix mixture in the fibers. Following impregnation, any excess matrix mixture on the fibers is allowed to drain off.

If the solution route to the preceramic mixture was used, the solvent is allowed to evaporate. Generally, any practical method such as air evaporation at room temperature or the use of vacuum or mild heat may be used. The resultant fibers which have been impregnated and the solvent evaporated are commonly called a "pre-preg".

If the melt method to the preceramic mixture is used, the impregnated fibers can merely be cooled to form the "pre-preg". Alternatively, however, the melt impregnated fibers may be formed prior to cooling by a process such as filament winding or pulltrusion. When these formed fibers are cooled, they can be immediately cured and fired as set forth below.

The prepregs formed above may, optionally, be partially cured so that they will hold the shape imparted in a subsequent step. This partial curing, also called "B-staging", is generally accomplished by heating in air at a temperature in the range of about 50 to about 150° C. for about 2 minutes to about 4 hours. Generally, heating at about 100° C. for 10 to 15 minutes is sufficient. This heating may be conducted by any appropriate means, but the use of an air convection oven or similar equipment is usually sufficient. Care should be taken during this curing step to avoid temperature and time combinations which result in excessive curing such that flowability of the resin in the later molding or pressing steps is significantly reduced.

The prepreg is then subjected to externally applied pressure while heating to form the composite into the desired shape and cause uniformity of resin about the fibers. Generally, this is accomplished by pressing the prepreg into a mold at a temperature and pressure which allows the resin to flow throughout the mold. The pressing conditions generally used therein include temperatures in the range of about 60° to about 300° C., pressures in the range of about 1 to 2500 pounds per square inch, and times in the range of about 2 minutes to about 6 hours. Pressing at about 175° C., 200–400 psi and 30 to 180 minutes generally provides satisfactory results. Temperatures and pressures which result in resin being forced out of the mold should be avoided.

It should be noted that if a 3-dimensional shape is desired, the above steps are often altered. To manufacture 3-D objects by this process, one generally first forms the fiber into the desired shape and then impregnates the formed fiber with the polymer mixture. The impregnated fibers are then pressed, cured, and fired as set forth herein.

The formed prepreg is next infusibilized (cured) to insure complete or nearly complete crosslinking such that deformation on pyrolysis will not occur. Any schedule which produces the desired result may be used so long as the temperature does not cause ceramification. A preferred schedule comprises heating at less than 5° C./minute to 285° C. and then holding for 16 hours. This curing step may be performed in the mold under pressure or it may be accomplished in a conventional oven under nitrogen without any applied pressure.

The pressed and cured product (green composite or molded part) is then slowly fired in a furnace to a temperature of at least 1000° C. in an inert atmosphere or vacuum until the product ceramifies. It is preferred that the green composite be fired at a temperature of about 1200° C. By slow firing it is meant that the composites are heated in a slow (eg., 2° C./min), stepwise or linear fashion until the majority of any higher boiling volatiles present escape the composite after which time the temperature can be quickly raised to the ultimate firing temperature. For example, the temperature for most composites should be raised to about 300° C. and the heating slowly continued until a temperature of about 800° C. is reached after which the temperature can be raised rather quickly to the ultimate firing temperature.

After completion of the firing process the composite is cooled. At least the initial cooling should also be under an inert atmosphere. When cooled, the resulting material is a uniform, hard, strong fiber reinforced composite. The volume percentage of fibers in the resulting composite can vary over a wide range depending on the desired use. Generally, it is preferred that about 10 to 65 volume percent of the composite is fiber.

The composites formed by the above process are generally quite porous. Since it may be preferred to produce dense objects (which have higher strength), it is within the scope of this invention to reimpregnate the composites formed above. This is accomplished by merely impregnating the composite with the preceramic matrix mixture (without fillers) as described above (by either the solution or melt route), curing the reimpregnated composite and then firing. This "reimpregnation" can be repeated until products with the desired density and strength are achieved.

The composites herein have many desirable properties such as good oxidation resistance at high temperatures, high strength and toughness, and a wide range of dielectric properties. For instance, the four-point flexural strength of the composites measured at room temperature and at temperatures up to 1100° C. in air generally exceed 30 ksi and often exceed 50 ksi. Similarly, the tangent modulus of these composites often exceed 10 Msi.

The following non-limiting examples are provided so that one skilled in the art might better understand the invention.

EXAMPLE 1 (COMPARATIVE)

A mixture of 75 g (80% by weight of the matrix precursor) vinyl-modified hydridopolysilazane (as made by Example 1 of U.S. Pat. No. 5,086,126), 18.75 g (20% by weight of the matrix precursor) boron nitride powder (less than 1 micron in size with a purity of 99.5%, obtained from Cerac, Inc.), 93.75 g toluene and 50 g of 5nM diameter silicon nitride grinding media were added to a plastic jar. The jar was placed on a jar roll mill and permitted to mix for 16 hours. The silicon nitride grinding media was then filtered from the slurry.

A 33 cm×50 cm cloth of uncoated Ceramic Grade NICALON Fiber in the form of a 0°/90° balanced 8 harness satin weave was coated with the slurry formed above. The coated cloth was then pulled through a set of aluminum rolls 3 times to evenly distribute the slurry on the cloth. The coated cloth was then placed in a chemical hood at room temperature for 20 minutes to evaporate the toluene solvent and leave a slightly tacky prepreg. After drying the prepreg cloth weighed 76.78 g.

The prepreg was cut into 12–10 cm×10 cm sections and stacked with the warp direction of the weave as 0° to make a 12 ply laminate composite. This composite was placed in a standard vacuum bag which consisted of a 30 cm×50 cm aluminum plate, one layer of peel ply, the 12 ply prepreg, another peel ply, a second 15 cm×15 cm aluminum plate and a sheet of Vac-Pac UHT-650-XT bonded to the aluminum plate with a high temperature tape (Schnee-Morehead 5158). A Vacuum port was introduced through the Vac-Pac sheet.

Actual molding of the composite was done by inserting the evacuated vacuum bag assembly into a 120° C. preheated molding press. A pressure of 200 psi was applied after 5 minutes and the composite was held under these conditions for 30 minutes. The temperature of the press was then increased to 180° C. for 1 hour and then to 260° C. for 2 hours while maintaining 200 psi. The system was permitted to cool to room temperature and the composite was removed from the bag.

The molded prepreg was flat and well formed. The excess matrix precursor which had flowed to the edge of the molded prepreg was removed and the molded prepreg was post cured in nitrogen at 285° C. for 20 hours. The resultant cured composite weighed 60.37 g and was 57.6% by volume fiber.

The cured composite was pyrolyzed in nitrogen at 1° C./minute from room temperature to 1000° C., held at 1000° C. for 1 hour, the temperature was increased to 1200° C. at 3.33° C./minute and held at temperature for 1 hour. The power to the furnace was then turned off and the furnace was allowed to cool to 50° C. under flowing nitrogen. The resultant composite weighed 58.67 g and had an open porosity of 25.9% by a liquid immersion test.

The composite was reimpregnated with a 30% by weight solution of the above vinyl modified hydridopolysilazane polymer in toluene. This was accomplished by placing the composite in an evacuated chamber, allowing the polymer solution to flow into the chamber to a level above the composite, opening the chamber to the atmosphere and allowing the composite to soak in the solution for 30 minutes. The composite was removed from the solution and the toluene was allowed to evaporate in a hood for 1 hour. The composite was then placed in an oven with a nitrogen purge and was heated to 285° C. for 2 hours to cure the polymer. The above solution impregnation was repeated and the composite reheated under nitrogen to 285° C. for 2 hours. The reimpregnated composite was then pyrolyzed to 1200° C. in the same manner as above.

The above reimpregnation-pyrolysis procedure was then repeated 9 more times. The resultant composite had a bulk density of 2.21 g/cm$^3$ and an open porosity of 2.4%. The composite was cut into flexural test bars and tested at room temperature. The test bars failed in a brittle fracture. The results of the tests are presented in Table 1.

EXAMPLE 2

A prepreg cloth comprising carbon-coated Nicalon fiber in vinyl-modified hydridopolysilazane was prepared in the same manner as Example 1 (38.9% by weight matrix precursor) and was cut into 6–15.2 cm×15.2 cm pieces to make a 6 ply composite. The composite was molded in the same manner as Example 1 except 400 psi pressure was used in the molding. The molded prepreg was post-cured at 285° C. under nitrogen for 20 hours and resulted in a product which weighed 66.67 g and contained 58.8% by volume fiber. The cured composite was pyrolyzed in the same manner as Example 1 which resulted in a ceramic composite with a bulk density of 1.93 g/cm$^3$, open porosity of 21% and weight of 63.8 g. The composite was reimpregnated as in Example 1 a total of 9 times to reach a bulk density of 2.25 g/cm$^3$ and open porosity of 6.9%. The composite was not brittle and it had the properties listed in Table 1.

EXAMPLE 3

A prepreg cloth comprising boron nitride-coated Nicalon fiber (0.3 to 0.5 micrometer coating of boron nitride applied on HVR Grade Nicalon) in vinyl-modified hydridopolysilazane was prepared in the same manner as Example 1 (46.7% by weight matrix precursor) and was formed, molded and cured in the same manner as Example 2. The resultant cured composite weighed 57.36 g and contained 55.2% by volume fiber. The cured composite was pyrolyzed in the same manner as Example 1 which resulted in a ceramic composite with a bulk density of 1.94 g/cm$^3$ and open porosity of 19.4%. The composite was reimpregnated as in Example 1 a total of 9 times to reach a bulk density of 2.21 g/cm$^3$ and open porosity of 6.5%. The composite was not brittle and it had the properties listed in Table 1.

EXAMPLE 4

A prepreg cloth comprising carbon-coated Nicalon fiber in silacyclobutasilazane polymer (prepared by the method of U.S. Pat. No. 4,835,238) was prepared in the same manner as Example 1 (37.4% by weight matrix precursor) and was cut into 6–10 cm×10 cm pieces to make a 6 ply composite. The composite was molded in the same manner as Example 1 except that the pre-heated press was at 220° C. and the pressure was 400 psi. The press was held at 220° C. for 1 hour then the temperature was increased to 260° C. for 2 hours. The system was permitted to cool to room temperature and the molded prepreg was post cured in nitrogen at 285° C. for 20 hours. The resultant cured composite weighed 35.28 g and was 48% by volume fiber. The cured composite was pyrolyzed in the same manner as Example 1 which resulted in a ceramic composite with a bulk density of 1.8 g/cm$^3$ and open porosity of 23.8%. The composite was reimpregnated as in Example 1 with a 30% by weight solution of vinyl-modified hydridosilazane polymer a total of 8 times to reach a bulk density of 2.19 g/cm$^3$ and open porosity of 6.9%. The composite was not brittle and it had the properties listed in Table 1.

EXAMPLE 5

A prepreg cloth comprising boron nitride-coated Nicalon fiber (0.3 to 0.5 micrometer coating of boron nitride applied on HVR Grade Nicalon) in silacyclobutasilazane polymer (prepared by the method of U.S. Pat. No. 4,835,238) was prepared in the same manner as Example 4 (47.8% by weight matrix precursor) and was cut into 6–14 cm×14 cm pieces to make a 6 ply composite. The composite was molded and cured in the same manner as Example 4 to prepare a cured composite which weighed 76.43 g and was 35.1% by volume fiber. The cured composite was pyrolyzed in the same manner as Example 1 which resulted in a ceramic composite with a bulk density of 1.74 g/cm$^3$ and open porosity of 22.2%. The composite was reimpregnated as in Example 4 with a 30% by weight solution of vinyl-modified hydridosilazane polymer a total of 7 times to reach a bulk density of 2.13 g/cm$^3$ and open porosity of 6.8%. The composite was not brittle and it had the properties listed in Table 1.

EXAMPLE 6

A prepreg cloth comprising boron nitride-coated Nicalon fiber (0.3 to 0.5 micrometer coating of boron nitride applied on HVR Grade Nicalon) in boron-modified hydridopolysilazane polymer was prepared in the same manner as Example 1 (34.8% by weight matrix precursor) and was cut into 6–15 cm×15 cm pieces to make a 6 ply laminate. (The boron-modified hydridopolysilazane polymer was prepared by slowly adding a solution comprising $BH_3$-tetrahydrofuran in tetrahydrofuran to a solution comprising the hydridopolysilazane polymer of U.S. Pat. No. 4,540,803 in toluene) The composite was molded in the same manner as Example 1 except that the pre-heated press was at 60° C. and 100 psi for 30 minutes, 123° C. and 100 psi for 1 hour, 225° C. and 100 psi for 1 hour, 260° C. and 100 psi for 1 hour, and 350° C. and 100 psi for 1 hour. The system was permitted to cool to room temperature under a pressure of 100 psi. The resultant cured composite weighed 74.0 g with a thickness of 0.074 inches and was 55% by volume fiber. The cured composite was pyrolyzed in the same manner as Example 1.

The composite was densified by a melt-impregnation-pyrolysis method which comprised measuring the open porosity of the composite followed by dipping the composite into a solution of the boron modified hydridopolysilazane polymer or painting a solution of the polymer onto the composite until enough polymer is added to fill the porosity. The polymer coated composite was then vacuum bagged and heated under vacuum by inserting the assembly into a 177° C. oven, holding for 1 hour, then heating to 260° C. The resultant composite was pyrolyzed as in Example 1 and the melt impregnation-pyrolysis cycle repeated 3 times to yield a composite with 12% open porosity. This composite was reimpregnated and pyrolyzed as in Example 1 by the solution method to yield a product with a bulk density of 2.15 g/cm$^3$ and open porosity of 6.5%. The composite was not brittle and it had the properties listed in Table 1.

EXAMPLE 7

A prepreg cloth comprising boron nitride-coated Nicalon fiber (0.3 to 0.5 micrometer coating of boron nitride applied on HVR Grade Nicalon) in boron-modified hydridopolysilazane polymer (prepared in the same manner as Example 6) (75% by weight of matrix) and beta silicon carbide powder (from Ibiden Co., Ltd.) (25% by weight of matrix) was prepared in the same manner as Example 1 (42.9% by weight matrix precursor) and was cut into 6–10 cm×7 cm pieces to make a 6 ply laminate. The laminate was molded in the same manner as Example 6. The resultant cured composite weighed 46.8 g with a thickness of 0.067 inches and was 58% by volume fiber. The cured composite was pyrolyzed and densified by the method of claim 6. The resultant composite had a bulk density of 2.2 g/cm$^3$ and open porosity of 7.3%. The composite was not brittle and it had the properties listed in Table 1.

EXAMPLE 8

A prepreg cloth comprising boron nitride coated carbon-coated Nicalon fiber (0.3 to 0.5 micrometer coating of boron nitride applied on HVR Grade Nicalon) in boron-modified hydridopolysilazane polymer (prepared in the same manner as Example 6) was prepared in the same manner as Example 1 (41.3% by weight matrix precursor) and was cut into 6–10 cm×10 cm pieces to make a 6 ply laminate. The composite was molded and post cured in the same manner as Example 6. The resultant cure composite weighed 77.97 g with 51.2% by volume fiber. The cured composite was pyrolyzed and densified in the same manner as Example 6. The composite was not brittle and it had the properties listed in Table 1.

EXAMPLE 9

A prepreg cloth comprising boron nitride-coated HPZ fiber (0.3 to 0.5 micrometer coating of boron nitride applied on HVR Grade Nicalon) in silacyclobutasilazane polymer (prepared by the method of U.S. Pat. No. 4,835,238) was prepared in the same manner as Example 1 (45.6% by weight matrix precursor) and was cut into 6–7.6 cm×10 cm pieces to make a 6 ply composite. The composite was molded and cured in the same manner as Example 4 to prepare a molded composite which weighed 17.7 g, had a thickness of 0.066 inches and was 35% by volume fiber. The molded composite was pyrolyzed and densified in the same manner as Example 4 which resulted in a ceramic composite with a bulk density of 2.08 g/cm$^3$ and open porosity of 6.4%. The composite was not brittle and it had the properties listed in Table 1.

EXAMPLE 10

A prepreg cloth comprising boron nitride-coated Nicalon fiber (0.3 to 0.5 micrometer coating of boron nitride applied on HVR Grade Nicalon) in boron-modified hydridopolysilazane polymer (prepared in the same manner as Example 6) (65% by weight of matrix), beta silicon carbide powder (from Ibiden Co., Ltd.) (25% by weight of matrix), and boron nitride powder (10% by weight of matrix) was prepared in the same manner as Example 1 (43.4% by weight matrix precursor) and was cut into 6–15 cm×15 cm pieces to make a 6 ply laminate. The laminate was molded in the same manner as Example 6. The resultant cured composite had a thickness of 0.085 inches and was 44% by volume fiber. The cured composite was pyrolyzed and densified by the method of Example 6. The resultant composite had a bulk density of 2.09 g/cm$^3$ and open porosity of 7.7%. The composite was not brittle and it had the properties listed in Table 1.

EXAMPLE 11

A prepreg cloth comprising boron nitride-coated Nicalon fiber (0.3 to 0.5 micrometer coating of boron nitride applied on HVR Grade Nicalon) in boron-modified hydridopolysilazane polymer (prepared in the same manner as Example 6) (75% by weight of matrix) and aluminum nitride powder (25% by weight of matrix) was prepared, molded, cured, pyrolyzed and densified by the method of Example 6. The composite was not brittle and it had the properties listed in Table 1.

EXAMPLE 12

A prepreg cloth comprising boron nitride-coated Nicalon fiber (0.3 to 0.5 micrometer coating of boron nitride applied on HVR Grade Nicalon) in boron-modified hydridopolysilazane polymer (prepared in the same manner as Example 6) (75% by weight of matrix) and silicon nitride powder (25% by weight of matrix) was prepared, molded, cured, pyrolyzed and densified by the method of Example 6. The composite was not brittle and it had the properties listed in Table 1.

EXAMPLE 13

A prepreg cloth comprising carbon-coated ceramic grade Nicalon fiber (100 angstrom coating of carbon) in a siloxane polymer (made in the same manner as Example 1 in U.S. Pat. No. 4,460,640) (70% by weight of matrix) and beta silicon carbide powder (from Ibiden Co., Ltd.) (30% by weight of matrix) was prepared in the same manner as Example 1. The pre-preg was molded using the vacuum bagging procedure of Example 1. The press was preheated to a temperature of 177° C. and a pressure of 100 psi was applied after 2 minutes. These conditions were maintained for 1 hour and the temperature was increased to 260° C. Temperature and pressure was maintained for 2 hours and the assembly was then allowed to cool to room temperature. After removal from the vacuum bag, the composite was post-cured at 260° C. for 16 hours in an air circulating oven. The cured composite was pyrolyzed and densified by the method of Example 1 using a 30% solution of siloxane polymer in toluene. The composite was not brittle and it had the properties listed in Table 1.

TABLE 1

Four-Point Flexural Strength of Composites

| EX | Fiber/Coating | Matrix | As Made | | | | After 50 h @ 538° C. in Air | | After 50 h @ 1100° C. in Air | | |
|---|---|---|---|---|---|---|---|---|---|---|---|
| | | | 25° C. | 538° C. | 1100° C. | 1300° C. | 25° C. | 538° C. | 25° C. | 1100° C. | 1300° C. |
| 1 | CG Nicalon/None | Vi—HPZ + 20% BN | 12.1 | — | — | — | | | | | |
| 2 | CG Nicalon/C | Vi—HPZ + 20% BN | 66.2 | 51.8 | 28.2 | 33.5 | 27.4 | 34.0 | 17.7 | 16.5 | 12.8 |
| 3 | CG Nicalon/BN | Vi—HPZ + 20% BN | 50.5 | 41.0 | 44.3 | 40.9 | — | — | 32.9 | 36.1 | 31.6 |
| 4 | CG Nicalon/C | SCBZ + 20% BN | 57.1 | 51.8 | 24.0 | — | | | | | |
| 5 | HVR Nicalon/BN | SCBZ + 20% BN | 34.9 | 41.0 | 39.8 | — | | | | | |
| 6 | HVR Nicalon/BN | B—HPZ + 20% BN | 53.5 | — | 68.2 | 61.5 | 46.4 | 54.0 | 49.6 | 60.7 | 59.9 |
| 7 | CG Nicalon/BN | B—HPZ + 25% SiC | 45.0 | 47.1 | 55.3 | 47.5 | 50.1 | 58.1 | 38.8 | 50.2 | — |
| 8 | CG Nicalon/C + BN | B—HPZ + 20% BN | 64.2 | 55.5 | 53.2 | 42.9 | 31.2 | 41.8 | 18.3 | 21.4 | — |
| 9 | HPZ/BN | SCBZ + 20% BN | 33.7 | 26.4 | 38.9 | — | | | | | |
| 10 | CG Nicalon/BN | B—HPZ + 25% SiC + 10% BN | 33.2 | 38.5 | 37.6 | — | 44.4 | 39.8 | 39.9 | 43.5 | 43.1 |
| 11 | HVR Nicalon/BN | B—HPZ + 25% AlN | 34.4 | 44.0 | 42.7 | — | 49.6 | 44.4 | 34.0 | 38.0 | — |
| 12 | HVR Nicalon/BN | B—HPZ + 25% Si$_3$N$_4$ | 50.7 | 55.4 | 55.7 | — | 54.4 | 48.6 | 42.3 | 50.8 | — |
| 13 | CG Nicalon/C | Silox. + 30% SiC | 43.7 | 45.6 | | | | | | | |

That which is claimed is:

1. A method for forming a high strength, oxidation resistant fiber-reinforced ceramic matrix composite which retains a tensile strength of at least 16.5 Ksi after being heated to at least 1100° C. in air, which process comprises:

(a) coating refractory fibers having an interfacial coating thereon which a preceramic matrix mixture comprising a curable preceramic polymer having a char which contains greater than about 50 weight % sealant oxide atoms;

(b) forming the coated fibers into the desired shape;

(c) curing the preceramic matrix mixture to produce a green body;

(d) heating the green body to a temperature of at least about 1000° C. in an inert atmosphere for a time effective to convert the preceramic polymer to a ceramic and thereby form a ceramic matrix composite; and (e) heating the ceramic matrix composite to a temperature above 1100° C. in an oxidizing environment to form an in situ coating comprising silica on the surface of the ceramic composite exposed to the environment.

2. The method of claim 1 wherein the preceramic matrix mixture additionally comprises a solvent and the solvent is evaporated from the coated fibers to form a prepreg prior to step (b).

3. The method of claim 2 wherein the solvent is an organic solvent selected from the group consisting of aliphatic hydrocarbons and aromatic hydrocarbons.

4. The method of claim 1 wherein the preceramic matrix mixture is formed by heating the curable preceramic polymer to a temperature above its melting point and the coated fibers is cooled to form a prepreg prior to step (b).

5. The method of claim 1 wherein the refractory fiber comprises a silicon-containing refractory ceramic fiber.

6. The method of claim 5 wherein the ceramic fiber comprises silicon, carbon and oxygen.

7. The method of claim 5 wherein the ceramic fiber comprises silicon, carbon, oxygen and nitrogen.

8. The method of claim 7 wherein the ceramic fiber is derived from hydridopolysilazane.

9. The method of claim 1 wherein the interfacial coating is selected from the group consisting of carbon, boron nitride, silicon carbide, silicon nitride, aluminum nitride and combinations thereof.

10. The method of claim 1 wherein the curable preceramic polymer comprises a polymer selected from the group consisting of polysilazanes, polycarbosilanes, polysiloxanes, polysilsesquioxanes, and polymetallosiloxanes.

11. The method of claim 10 wherein the curable preceramic polymer is a polysilazane polymer selected from the group consisting of hydridopolysilazanes, silacyclobutasilazanes, boron-modified hydropolysilazanes and vinyl-modified hydridopolysilazanes.

12. The method of claim 1 wherein about 20 to about 65 percent by volume of the composite comprises fiber.

13. The method of claim 1 wherein the preceramic matrix mixture additionally comprises fillers.

14. The method of claim 13 wherein the fillers are selected from the group consisting of boron nitride, silicon carbide, silicon nitride, silicon hexaboride, boron carbide, titanium boride, boron, titanium carbide and aluminum nitride.

15. The method of claim 1 wherein the preceramic matrix mixture of step (a) is additionally cured prior to forming them into the desired shape in step (b).

16. The method of claim 1 wherein the forming in step (b) is accomplished by pressing the coated fibers into a mold at a temperature in the range of about 60° to about 300° C., a pressure in the range of about 1 to 2500 pounds per square inch, and for a time in the range of about 2 minutes to 4 hours.

17. The method of claim 1 wherein the curing in step (c) is accomplished by heating in air at a temperature of less than about 300° C. for a time sufficient to crosslink the polymer.

18. The method of claim 1 wherein the heating in step (d) is at a temperature of about 1200° C.

19. The method of claim 1 wherein the resultant composite is subjected to steps (a), (b), (d), and (e) one or more times.

20. A method of forming a high strength, oxidation resistant 3-dimensional fiber-reinforced ceramic matrix composite which retains a tensile strength of at least 16.5 Ksi after being heated to at least 1100° C. in air, which process comprises:

(a) forming refractory fibers having an interfacial coating thereon into a preform;

(b) impregnating the preform with a preceramic matrix mixture comprising a curable preceramic polymer having a char which contains greater than about 50 weight % silicon atoms;

(c) curing the formed impregnated preform; and (d) heating the cured impregnated preform of (c) to a temperature of at least about 1000° C. in an inert atmosphere for a time effective to convert the preceramic polymer to a ceramic.

* * * * *